(12) United States Patent
Qian et al.

(10) Patent No.: US 10,757,248 B1
(45) Date of Patent: Aug. 25, 2020

(54) IDENTIFYING LOCATION OF MOBILE PHONES IN A VEHICLE

(71) Applicant: International Business Machines Corporation, Armonk, NY (US)

(72) Inventors: Jun Qian, Beijing (CN); Xinlin Wang, Irvine, CA (US); Cheng Luo, Beijing (CN); Lan Cao, Beijing (CN); Cheng Cheng Dong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/361,288

(22) Filed: Mar. 22, 2019

(51) Int. Cl.
| | | |
|---|---|---|
| *H04W 4/02* | (2018.01) | |
| *H04M 1/72* | (2006.01) | |
| *H04M 1/725* | (2006.01) | |
| *H04W 4/40* | (2018.01) | |

(52) U.S. Cl.
CPC ....... *H04M 1/72577* (2013.01); *H04W 4/025* (2013.01); *H04W 4/40* (2018.02)

(58) Field of Classification Search
CPC ......... H04M 1/72577; H04M 2250/10; H04M 2250/12; H04M 2250/52; H04M 1/6091; H04W 4/40; H04W 4/025; H04W 64/006
See application file for complete search history.

(56) References Cited

U.S. PATENT DOCUMENTS

| | | |
|---|---|---|
| 8,952,800 B2 | 2/2015 | Bantz |
| 8,994,492 B2 | 3/2015 | Fariborz et al. |
| 9,042,872 B1 | 5/2015 | Breed et al. |
| 9,198,113 B2 | 11/2015 | Rajeevalochana et al. |
| 9,544,687 B2 * | 1/2017 | Srinivasan ............. H04R 3/002 |
| 9,721,173 B2 | 8/2017 | Beilei et al. |
| 9,769,308 B2 | 9/2017 | Livingston et al. |
| 10,093,229 B2 * | 10/2018 | Baker ...................... B60Q 9/00 |
| 10,117,060 B1 | 10/2018 | Snyder et al. |
| 10,183,680 B2 * | 1/2019 | Lim .......................... G06F 9/00 |
| 10,469,305 B2 * | 11/2019 | Xuan ................ H04M 1/72577 |
| 2011/0183601 A1 | 7/2011 | Hannon |
| 2013/0271605 A1 | 10/2013 | Winner, Jr. |
| 2013/0336094 A1 | 12/2013 | Gruteser et al. |
| 2014/0249717 A1 | 9/2014 | Takahashi et al. |
| 2014/0335902 A1 | 11/2014 | Guba et al. |
| 2015/0054639 A1 | 2/2015 | Rosen |
| 2015/0286884 A1 | 10/2015 | Xu |

(Continued)

OTHER PUBLICATIONS

"Toyota Patents Eyelid Detection Technology to Deter Distracted Driving", Joe Meyers Toyota, <https://www.ioemyerstoyota.com/blog/2015/march/26/toyota-patents-eyelid-detection-technology-to-deter-distracted-driving.htm>, Thursday, Mar. 25, 2016, 1 page.

(Continued)

*Primary Examiner* — Khawar Iqbal
(74) *Attorney, Agent, or Firm* — Monchai Chuaychoo (57) ABSTRACT

An approach for recommending activating a safety feature on a mobile device in a vehicle. The approach includes collecting sound characteristics. Furthermore, determining if the mobile device is moving faster than a predetermined velocity and invoking grouping service on a server. The approach determines the number of the mobile device in the vehicle and determines which one of the one or more of the mobile devices belongs to the user operating the vehicle and activating a safe drive mode feature on the mobile device belonging to the user of the vehicle.

14 Claims, 6 Drawing Sheets

(56) References Cited

U.S. PATENT DOCUMENTS

| | | | | |
|---|---|---|---|---|
| 2016/0036964 | A1* | 2/2016 | Barfield, Jr. | H04M 1/72569 455/418 |
| 2016/0133133 | A1* | 5/2016 | Triplett | H04W 4/02 340/932.2 |
| 2016/0248906 | A1 | 8/2016 | Schrader et al. | |
| 2017/0082649 | A1 | 3/2017 | Tu et al. | |
| 2018/0183924 | A1* | 6/2018 | Damen | H04M 1/72577 |
| 2018/0192285 | A1* | 7/2018 | Schmidt | H04W 4/44 |
| 2018/0268626 | A1* | 9/2018 | Arashima | G06Q 40/08 |
| 2018/0322311 | A1* | 11/2018 | Kobayashi | G06F 21/33 |
| 2019/0025402 | A1* | 1/2019 | Qu | G01S 5/26 |
| 2019/0147741 | A1* | 5/2019 | Rosas-Maxemin | B60W 40/00 701/425 |
| 2019/0149654 | A1* | 5/2019 | Stuntebeck | H04M 1/72577 |
| 2019/0210607 | A1* | 7/2019 | Kobayashi | B60K 28/063 |
| 2019/0339696 | A1* | 11/2019 | Mori | B60W 50/082 |
| 2019/0349466 | A1* | 11/2019 | Cohen | H04M 1/72569 |
| 2019/0349470 | A1* | 11/2019 | Abramson | G01C 21/3484 |

OTHER PUBLICATIONS

Chu, Hon Lung, "In-Vehicle Driver Detection Using Mobile Phone Sensors", Duke ECE, Electrical and Computer Engineering, Apr. 20, 2011, <https://ece.duke.edu/sites/ece.duke.edu/files/GWDD2011_Chu.pdf>, 21 pages.

Heineman, Karin, "Technology Can Detect Driver Phone Use", Inside Science, Friday, Apr. 13, 2012, <https://www.insidescience.org/video/technology-can-detect-driver-phone-use>, 5 pages.

Yang et al., "Detecting Driver Phone Use Leveraging Car Speakers", MobiCom'11, Sep. 19-23, 2011, Las Vegas, Nevada, USA, Copyright 2011, ACM 978-1-4503-0492-Apr. 11, 2009, <http://www.winlab.rutgers.edu/~gruteser/papers/mobi22c_yang.pdf>, 12 pages.

Yang et al., "Sensing Driver Phone Use with Acoustic Ranging Through Car Speakers", Digital Object Indentifier 10.1109/TMC.2012.92 1536-1233/12/$31.00 © 2012 IEEE, <https://ieeexplore.ieee.org/document/6180171>, 16 pages.

* cited by examiner

IDENTIFYING LOCATION OF MOBILE PHONES IN A VEHICLE

BACKGROUND OF THE INVENTION

The present invention relates generally to the field of transportation, and more particularly to passenger safety while using mobile devices during travel.

There has been an increasing number of automobile accidents involved with the use of mobile device (e.g., smartphones, etc.) by the driver of the vehicle. Although, there have been recent contributions made in the area of reducing driver distraction such as by allowing mobile users handling their mobile devices with less effort while driving (e.g., handsfree talking via Bluetooth, etc.). Additionally, there are active efforts in developing driver distraction detection systems and systems that help manage interoperability. One such system uses an acoustic ranging system.

For example, an acoustic ranging system leverages the existing car stereo infrastructure to locate smartphones by exploiting only a single microphone and multiple speakers. This approach is designed to be unobtrusive and leverages ubiquitous off-the-shelf smartphones. A key contribution is its robustness under heavy multipath (i.e., multiple paths and directions of in-car speakers and in-car microphones) and noisy in-car environments. This system differs from typical acoustic human speaker localization, in that, it uses a single microphone and multiple sound sources rather than a microphone array to detect a single sound source.

SUMMARY

Embodiments of the present invention disclose a computer-implemented method and a computer system for activating a safety feature on a mobile device in a vehicle. The computer-implemented method may include one or more computer processors for collecting sound characteristics associated with a vehicle by a mobile device belonging to a user; determining if the mobile device belonging to the user is moving faster than a predetermined velocity; responsive to determining that the mobile device is moving faster than the present velocity, invoking grouping service on a server; determining the number of the mobile device in the vehicle; responsive determining that there are more than one of the mobile device, determining, which one of the mobile device belongs to the user operating the vehicle; and activating a safe drive mode feature on the mobile device belonging to the user of the vehicle.

According to another embodiment, the computer system containing one or more computer processors; one or more computer readable storage media; program instructions stored on the one or more computer readable storage media for execution by at least one of the one or more computer processors, the program instructions comprising: program instructions to collect, sound characteristics associated with a vehicle by a mobile device belonging to a user; program instructions to determine if the mobile device belonging to the user is moving faster than a predetermined velocity; responsive to determining that the mobile device is moving faster than the present velocity, program instructions to invoke grouping service on a server; program instructions to determine the number of the mobile device in the vehicle; responsive to determining that there are more than one of the mobile device, program instructions to determine which one of the mobile device belongs to the user operating the vehicle; and program instructions to activate a safe drive mode feature on the mobile device belonging to the user of the vehicle.

DETAILED DESCRIPTION

Embodiments of the present invention recognize that improvements in the detection of mobile devices (e.g., smartphones, etc.) within a vehicle during travel can be enhanced. Detection of a location of a mobile device in a moving vehicle can be realized by leveraging existing sound location technology in conjunction with the use of a mobile device. Using acoustic ranging and detection, seating positions (e.g., driver seat, front passenger seat, etc.) of one or more mobile devices can be detected. For example, an application running on a mobile device can detect the sound of vehicle doors closing and the sound of an ignition switch activation. Then, leveraging a machine learning algorithm, the application can discern the difference between the front driver side door closing and the front passenger side door closing and determine the location of the mobile device in the vehicle with respect to the seating position.

The application on the mobile device can use sound source localization (SSL) technology to detect and record a direction of arrival (DOA) and can use sound pressure level (SPL) of the vehicle sounds (e.g., doors closing, ignition button pushed, engine starting, etc.) made by the driver and any passengers. For example, a driver enters a vehicle and starts the vehicle, there can be at least four sounds (e.g., driver side door closing, seat belt latching, ignition switch being pressed and sound of the engine starting, etc.) that the application can collect to determine the location of the associated mobile phone.

Furthermore, the application on the mobile device can discern whether the user of the mobile device is in a private vehicle (e.g., personal car) versus a public vehicle (e.g., bus, train, etc.). For example, the application can detect and track the movement and speed of the mobile device. Based on at least those aforementioned factors, the application can determine if the user is riding on public transportation or in a private vehicle (i.e., not a commercial vehicle).

Additionally, if there is more than one mobile device in the vehicle, all mobile devices in the same vehicle can be identified and grouped by the backend component 115. For example, (referring to FIG. 3) five mobile devices are in a vehicle occupying all possible seating locations. The application on each mobile device communicates with the backend component 115 on backend server 110. Backend component 115 can coordinate between all the mobile devices in the same vehicle and share the location of each mobile device to each other (with a self-organized way or by the backend election service) in order to identify the mobile device located in the driver seat.

Detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Figure 1:
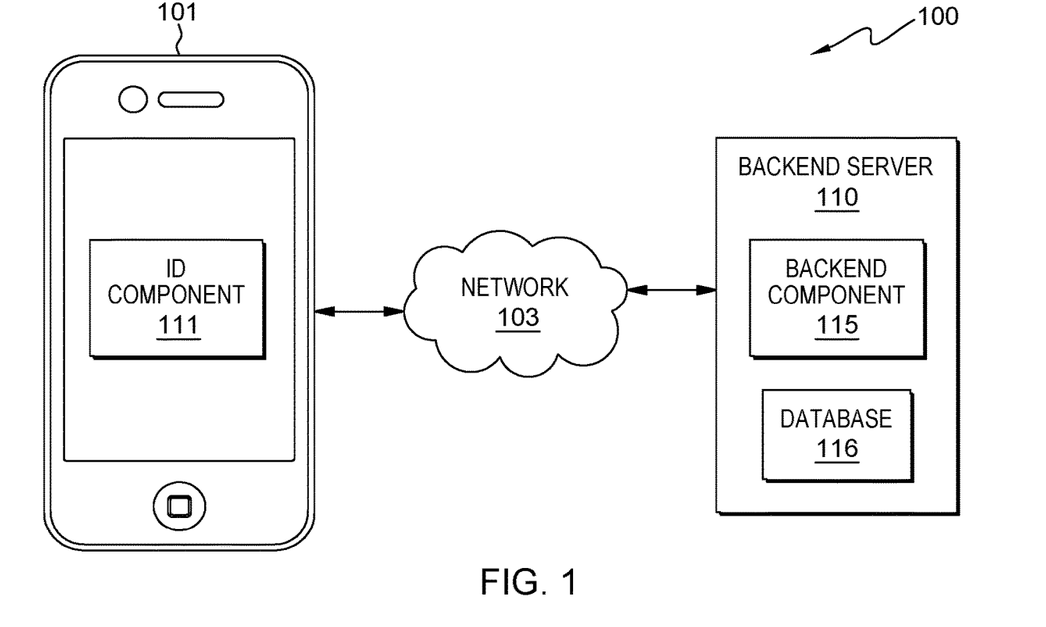
FIG. 1 is a functional block diagram illustrating the mobile device detection environment, designated as 100, in accordance with an embodiment of the present invention.

FIG. 1 is a functional block diagram illustrating the mobile device detection environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Mobile device detection environment 100 includes mobile device 101 and backend server 110, all interconnected over network 103.

Mobile device 101 can be a mobile computing device, or any other electronic device or computing system capable of receiving, sending, and processing data. Mobile device 101 allows users to access ID component 111 and backend component 115 on backend server 110. Mobile device 101 includes ID component 111.

ID component 111 of the present invention, an application on mobile device 101, provides the capability of determining mobile device 101 location based on the mobile device 101 location in the vehicle. Furthermore, ID component 111 can distinguish, through deep learning techniques (e.g., artificial intelligence, neural network, etc.), the sound characteristics unique to each vehicle (e.g., front passenger door closing for a 2002 Porsche™ 911 Turbo versus front passenger door closing for a 2006 BMW™ M5, ignition switch being pressed in a 2018 Ford™ Mustang GT 500 versus in a 2017 Ford™ Mustang 350R, etc.). It should be noted that ID component 111 can retrieve one or more sound models from backend server 110 to compare collected sounds against a known sound model. Additionally, ID component 111 can identify the type of vehicle that the one or more users are riding/driving and based on the identification, ID component 111 can determine the seating location of the associated mobile device. It should be noted that the same application is operational on each mobile device in a vehicle and each application can independently determine whether the hosting mobile device belongs to the driver (i.e., driver seating position). Once the mobile device belonging to the driver has been identified, the application may activate a safe driving mode (e.g., turning off mobile data, sending an alert to put the phone down, etc.) for the associated mobile device.

Network 103 can be, for example, a telecommunications network, a local area network (LAN), a wide area network (WAN), such as the Internet, or a combination of the three, and can include wired, wireless, or fiber optic connections. Network 103 can include one or more wired and/or wireless networks that are capable of receiving and transmitting data, voice, and/or video signals, including multimedia signals that include voice, data, and video information. In general, network 103 can be any combination of connections and protocols that can support communications between backend server 110, mobile device 101 and other computing devices (not shown) within mobile device detection environment 100.

Backend server 110 can be a standalone computing device, a management server, a web server, a mobile computing device, or any other electronic device or computing system capable of receiving, sending, and processing data. In other embodiments, backend server 110 can represent a server computing system utilizing multiple computers as a server system, such as in a cloud computing environment. In another embodiment, backend server 110 can be a laptop computer, a tablet computer, a netbook computer, a personal computer (PC), a desktop computer, a personal digital assistant (PDA), a smart phone, or any other programmable electronic device capable of communicating with other computing devices (not shown) within mobile device detection environment 100 via network 103. In another embodiment, backend server 110 represents a computing system utilizing clustered computers and components (e.g., database server computers, application server computers, etc.) that act as a single pool of seamless resources when accessed within mobile device detection environment 100. In general, backend server 110 provides the ability to coordinate between multiple mobile devices 101 in the same vehicle (e.g., grouping mobile devices in a daemon service, etc.) and assist with training of recognizing specific vehicles based on sounds (i.e., create/train/re-train multiple sound models). Backend server 110 includes backend component 115 and database 116.

Backend component 115 in the present embodiment has the capability of creating sound models (e.g., specific vehicle models, etc.) based on either collected sound data (e.g., doors closing, activation of ignition switches, etc.) or the training sound data. Backend component 115 can create the following sound models: a first model based on acoustic features, a second model based on DOA and sound pressure of a door closing sound and a third model based on DOA and sound pressure of an ignition switch operation sound. For example, the first sound model may respond to the collected sound from ID component 111 on mobile device 101 as, "Driver door closing detected by the front passenger of a 2014 Ford™ Fusion 4 door sedan." In another example, the second sound model may respond to the collected sound as, "Engine started, sound detected by ID component 111 located in the front seat of a 2016 BMW™ X6."

It should be noted that backend server 110 can initially create sound models based on sounds collected by ID component 111 during an observation period or sounds provided by training data. It is noted that training data can be pre-determined and pre-configured of sounds associated with a plurality of vehicles. Furthermore, sound models can be trained, or refined by retraining, by backend component 115 via machine learning. For example, an existing sound model previously used by mobile device 101 for a vehicle no longer allows ID component 111 to identify the vehicle because the user is carrying moving boxes in the vehicle (i.e., blocking and/or interfering with sound waves from doors closing and ignition sound). Therefore, backend server 110, at the request of ID component 111, can retrain the existing models to allow the mobile device 101 to correctly identify the seating location based on the change in the interior acoustics of the vehicle.

In an embodiment, users can provide pre-defined training data associated with one or more vehicles to backend component 115 instead of utilizing the observation period via machine learning. It is noted that an observation period can be pre-defined, pre-determined and adjustable by the user. For example, the observation period can be 30 mins or two hours. The pre-defined training data can be sound files for a plurality of vehicles. For example, the sound files of the doors closing (e.g., DOA, SPL and frequency, etc.) for variations of a Ford™ Focus (e.g., Ford™ Focus Hatchback, two door variants, Focus™ ST, etc.). In another example, the sound files of the activation of the ignition switch (e.g., DOA, SPL and frequency, etc.) for variations of a BMW™ 5 Series sedan.

In another embodiment, sound models can be updated on the fly by backend component 115. For example, backend component 115 can receive a sound file for a vehicle model (e.g., 2013 Ford™ Focus ST) from ID component 111. ID component 111 can monitor and record various sounds of the vehicle over a period of time before sending a created sound file to backend component 115.

Backend component 115 can group multiple mobile devices 101 in the same vehicle into a group according to movement tracking and speed change history of the mobile devices 101 (via GPS technology). For example, if there is more than one mobile device 101 in a vehicle and the group of mobile devices 101 cannot determine their individual locations in the vehicle, the group of mobile devices 101 individually report this failure to the backend component 115 along with additional sound data. The backend component 115 can retrain the sound models one time then provide the retrained sound models to each mobile device 101 in the vehicle. This results in efficient operation of the backend component 115 because the backend component 115 uses grouping knowledge to eliminate the computational expense of retraining the model for each mobile device 101 in the vehicle. Furthermore, the ID component 111 residing on a mobile device 101 does not interact with the ID component 111 on other mobile devices 101 in the same vehicle (e.g., reduces bandwidth and processor usage between all mobile devices and server utilization, etc.). Accordingly, each mobile device 101 in a vehicle, independently determines whether it is the mobile device 101 associated with the driver seat location. In another embodiment, ID component 111 on each mobile device 101 residing the same vehicle may work together to determine which mobile device 101 in the group is in the driver seating position.

Ultimately, it is the decision of backend component 115 on the methodology used to determine grouping if more than one mobile device 101 is located in the same vehicle. However, the preferred methodology is for each mobile device 101 to identify itself (mobile device) in the driver seating location. It should be noted that backend component 115 can communicate with ID component 111 using REST (Representation State Transfer) API commands (e.g., GET, POST, PUT, etc.). For example, a first mobile device 101 can send a GPS location to backend server 110 and wait for an acknowledgment using REST API commands while a second mobile device 101 can perform the same function independently using REST API commands with backend server 110.

Database 116 is a repository for data used by access ID component 111. Database 116 can be implemented with any type of storage device capable of storing data and configuration files that can be accessed and utilized by backend server 110, such as a database server, a hard disk drive, or a flash memory. Database 116 uses one or more of a plurality of techniques known in the art to store a plurality of information. In the depicted embodiment, database 116 resides on backend server 110. In another embodiment, database 116 may reside elsewhere within 100, provided that ID component 111 has access to database 116. For example, database 116 can reside on mobile device 101. Database 116 may store information such as the various sound models.

Figure 2:
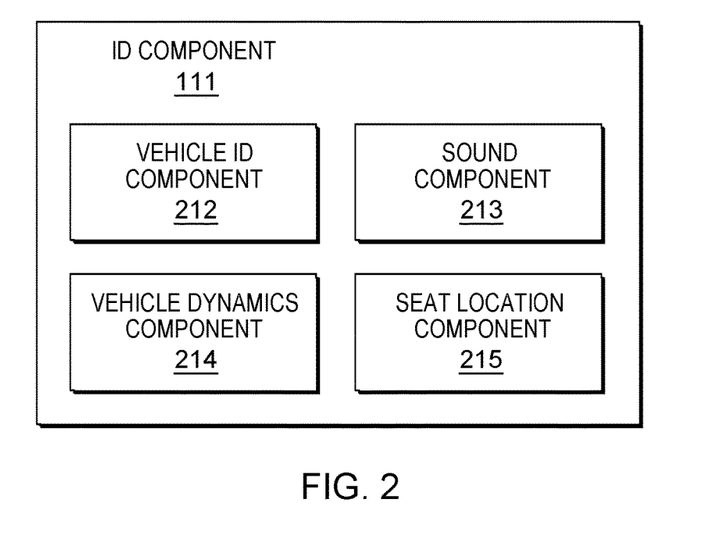
FIG. 2 is a functional block diagram illustrating the individual components of ID component 111 residing in mobile device detection environment in accordance with an embodiment of the present invention.

FIG. 2 is a functional block diagram illustrating the individual components of ID component 111 residing in mobile device detection environment 100 in accordance with an embodiment of the present invention. ID component 111 includes vehicle ID component 212, sound component 213, vehicle dynamics component 214 and seat location component 215.

Vehicle ID component 212 in the present embodiment has the capability of discerning various sounds via sound component 213 and can determine the vehicle make and model by using machine learning or comparing sound against existing sound models. For example, the user closes a door of the vehicle, vehicle ID component 212 can determine, through machine learning, that the detected sound is the sound of a driver side door of a 2015 Ford™ Mustang GT500. In another example, a user starts a vehicle, vehicle ID component 212 can determine, by processing an ignition sound against sound models, that the sound is from an ignition switch for a 2006 BMW™ M5.

Sound component 213 in the present embodiment has the capability of collecting sounds made by the passenger and/or operational sound by the vehicle. For example, sound component 213 can collect and record the sound of the door closing and the sound of the ignition switch activation in a vehicle. The recorded sound can be stored in database 116 for later use as training data for the various sound models stored in database 116 on backend server 110. It is noted that the recorded sound of the closing door can comprise, but is not limited to, the frequency of the sound waves, the DOA of the sound waves and the SPL from each closing door.

Vehicle dynamics component 214 in the present embodiment has the capability of tracking the movement (e.g., speed, acceleration, etc.) of the vehicle by using GPS or any known location detection technique. Furthermore, vehicle dynamics component 214 can record and store data from the movement of the mobile device 101 into database 116. Additionally, vehicle dynamics component 214 can determine if the vehicle used by the passenger is a private (e.g., own car, etc.) or public vehicle (e.g., bus, taxi, etc.) based on using GPS tracking technology and grouping data. For example, a public vehicle follows a predetermined path (e.g., a bus route schedule) while a private vehicle does not conform to a specific path and schedule.

Additionally, vehicle dynamics component 214 can activate a safe driving mode on the mobile device. Safe drive mode is a feature that prohibits or disables a passenger/driver from using data (or limited use of voice calls and text messages) on a mobile device 101 (e.g., while this mode is active, a mobile device cannot browse the internet, watch online videos, etc.). It should be noted that safe drive mode can be automatically deactivated once the mobile device has moved a predefined distance from a public roadway. Furthermore, safe driving mode can force the operator of the vehicle to switch to a Bluetooth "hands free" for conversation. It should be noted that safe driving mode can be dynamically configured to disable all data to the mobile device 101 or to a certain application on the mobile device 101. For example, ID component 111 can disable social media applications and only allow data to a navigation application.

Seat location component 215 in the present embodiment has the capability of determining the seat location of the mobile device by comparing collected sounds (through vehicle ID component 212) against the sound models. Additionally, seat location component 215 can receive models from backend server 110 to validate or update the sound model based on real time data.

Seal location component 215 can use at least three sound identification processes to determine the final seat location of each mobile device 101 by leveraging known techniques such as acoustic ranging and location classification. The first sound identification process classifies the sound of the closing door and the operational sound of the ignition switch. The second sound identification process predicts the seat location by using DOA and SPL of the door closing sound. The third sound identification process predicts the seat location by using DOA and sound pressure of the operation of the ignition switch. After receiving the result from the three sound identification processes, seat location component 215 can determine the final location of the mobile device based on those results (e.g., simple majority decision, etc.). It is noted that a predetermined "region" or zone around each seat location (for each vehicle) may be used to determine the what qualifies as a mobile device belonging to a seat location. The predetermined region can be user adjustable to accommodate passenger/drivers of various sizes.

Figure 3:
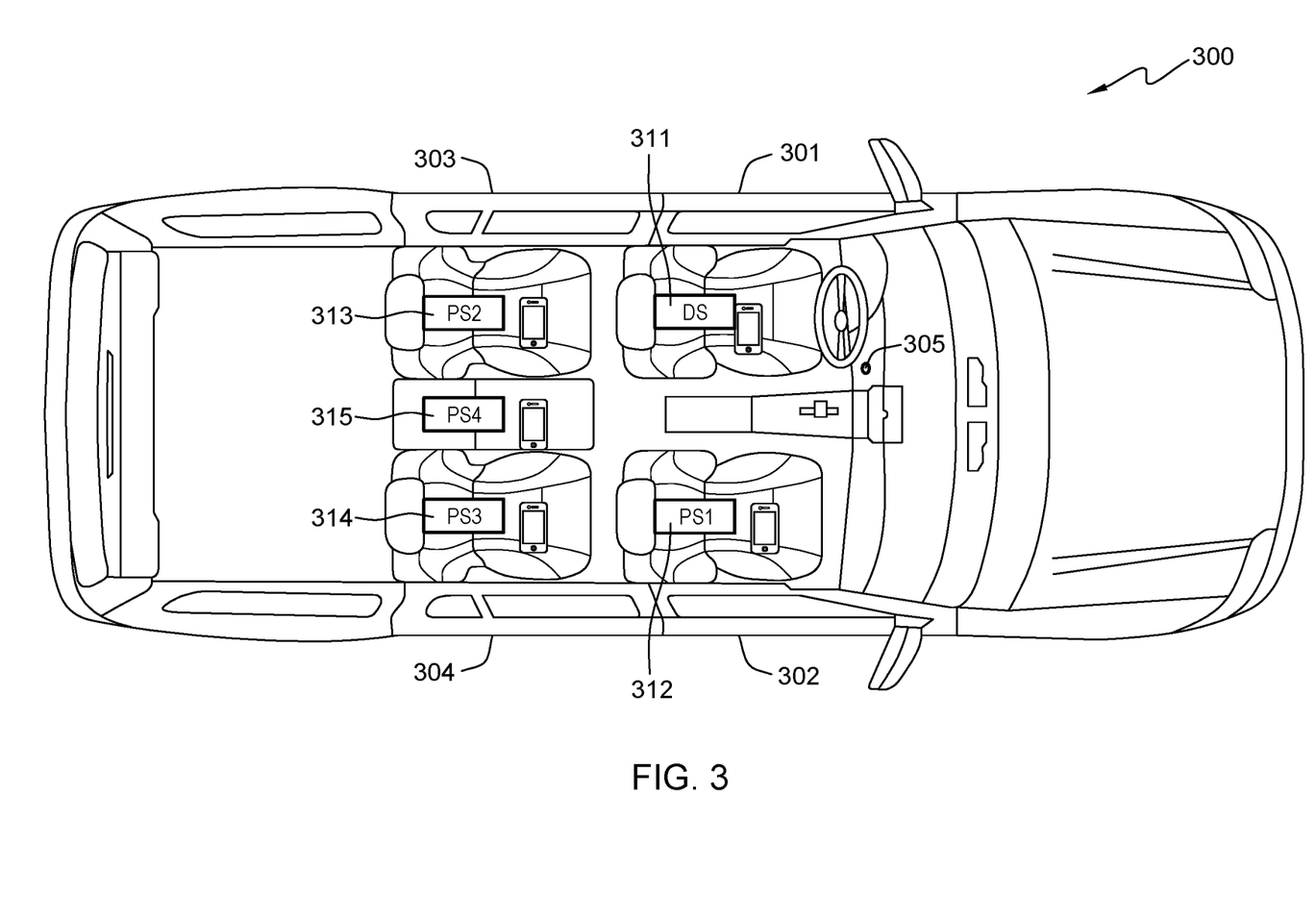
FIG. 3 illustrates locations of mobile devices in various seating positions of a vehicle designated as 300, in accordance with an embodiment of the present invention.

FIG. 3 illustrates locations of mobile devices in various seating positions of a vehicle designated as 300, in accordance with an embodiment of the present invention. Vehicle 300 includes door one 301, door two 302, door three 303, door four 304, ignition switch 305, driver seat 311, passenger seat one 312, passenger seat two 313, passenger seat three 314 and passenger seat four 315.

Figure 4:
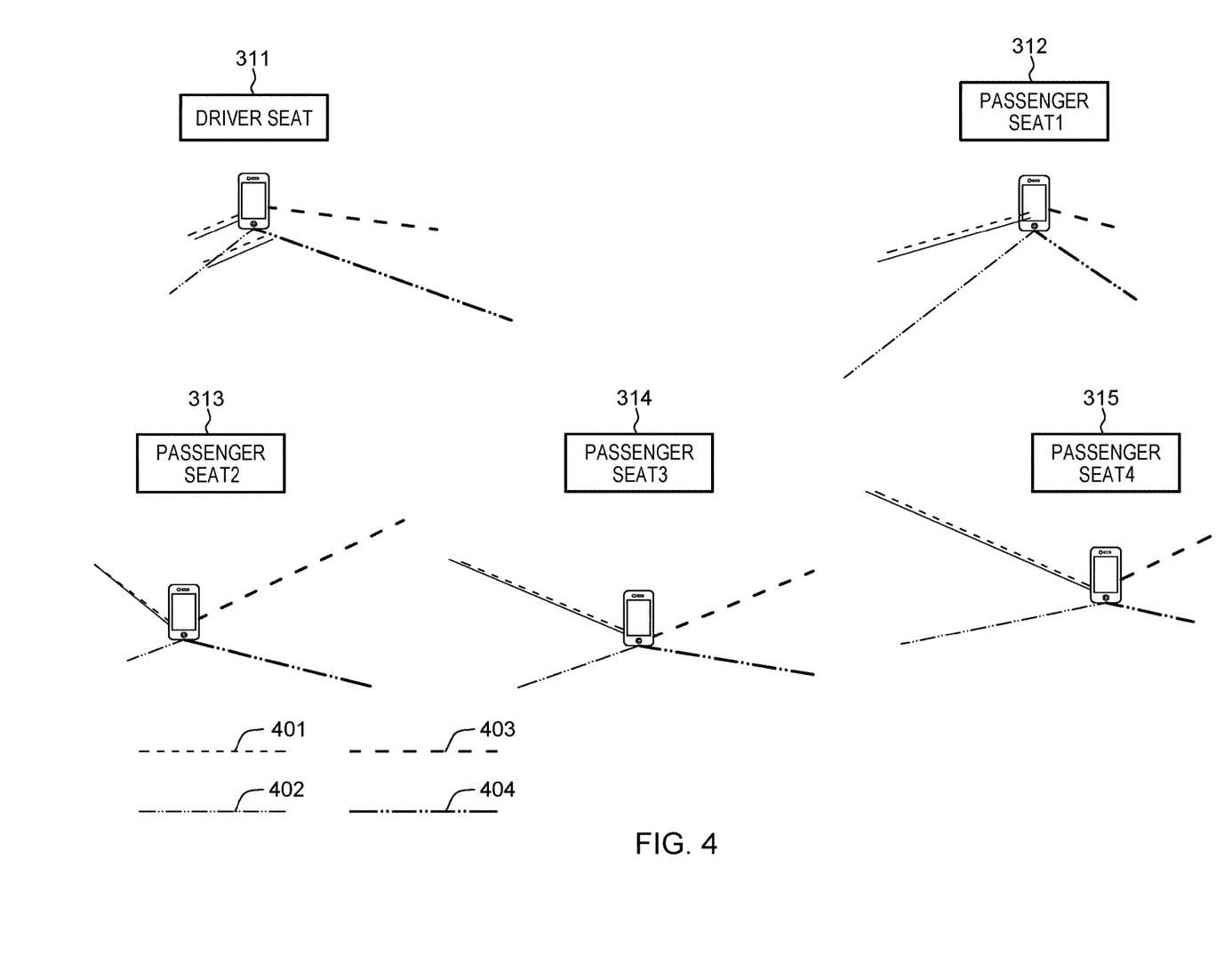
FIG. 4 illustrates each soundwave echo location based on each door of the vehicle closing in proximity to each position of the mobile devices from FIG. 3, in accordance with an embodiment of the present invention.

FIG. 4 illustrates each soundwave echo location based on each door of the vehicle closing in proximity to each position of a mobile device 101 from FIG. 3, in accordance with an embodiment of the present invention.

A use case scenario will be described to illustrate the operation with regards to FIG. 3, FIG. 4 and FIG. 5. A driver and four passengers with mobile devices 101 enter a four-door sedan with five seats. The driver enters the vehicle via door one 301. Passenger one enters the vehicle via door two 302. Passenger two enters via door three 303. Passengers three and four enter the vehicle via door four 304. The driver sits in driver seat 311. Passenger one sits in passenger seat one 312. Passenger two sits in passenger seat two 313. Passenger two sits in passenger seat three 314 and Passenger four sits in passenger seat four 315. The driver starts the engine via ignition switch 305. ID component 111, operational on each mobile device 101, performs the following functions: extract and classify the door close sounds and the ignition switch activation sound by using acoustic recognition based on Machine Learning; determine the DOA (direction of arrival) angle value and the sound pressure value of the door close sound and the ignition switch activation sound; and input the DOA angle value and sound pressure value as input data to run a a pre-trained Machine Learning model, to identify the seat location of the associated mobile device 101.

ID component 111, associated with the mobile device 101 in driver seat 311, can determine the seat location of the mobile device 101 based on sound waves reaching the microphone of the mobile device 101 using well known acoustic location technology such as acoustic ranging and location classification. The sound waves will arrive at different times and from different angles. Using the DOA angle of the door(s) closing combined with other sounds, (e.g., ignition switch 305), ID component 111 can identify if its associated mobile device 101 is in driver seat 311. For example, mobile device 101 in drive seat 311 can detect first sound wave 401, second sound wave 402, third sound wave 403 and fourth sound wave 404 wherein first sound wave 401 is the sound wave made by the driver door closing. ID component 111 can calculate a DOA angle value for first sound wave 401. It should be noted that calculating a DOA angle for a sound wave is well known in the art by methodology such as sound source technologies and acoustic location. For example, first sound wave 401 can contain two components for measurement. The first component is the angle, detected by mobile device 101, of the sound of closing door one 301 (i.e., driver's door). The second component is the sound pressure level of the sound of the closing door. Second sound wave 402, is made by door two 302. Third sound wave 403 is made by door three 303 and fourth sound wave 404 is made by door four 304.

The same method is applied to the remaining mobile device in the remaining positions/seats of vehicle (e.g., passenger seat one 312, passenger seat two 313, passenger seat three 314, passenger seat four 315, etc.) to identify the seating position. After ascertaining the location of the first mobile device is in the driver seat, ID component 111 can assert that its hosting mobile device belongs to a driver who is driving a vehicle and can switch to the safe driving mode.

Figure 5:
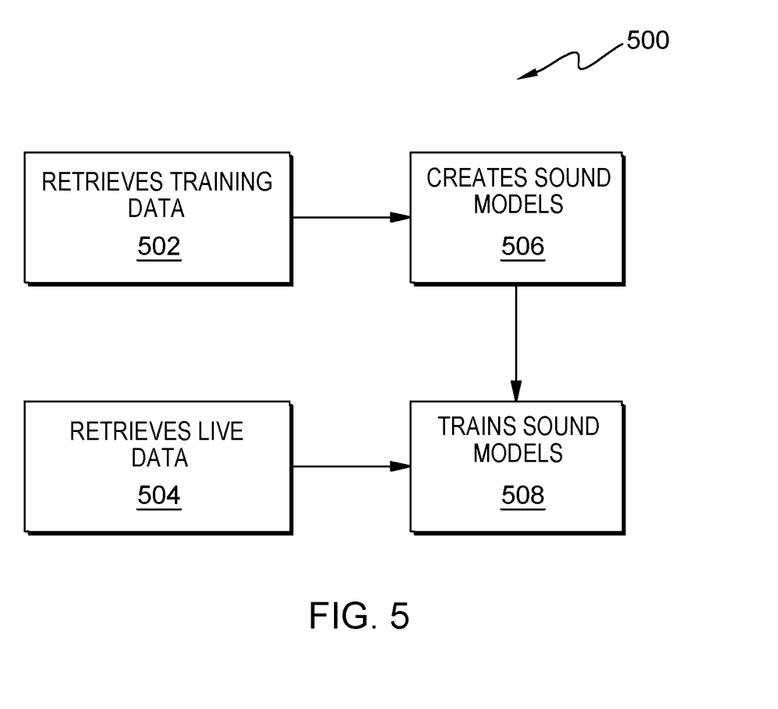
FIG. 5 is a flowchart illustrating activity of a backend server, designated as 500, in accordance with an embodiment of the present invention.

FIG. 5 is a flowchart illustrating the activity of backend server 110, designated as 500, in accordance with an embodiment of the present invention.

Using the previous use case scenario with five mobile devices 101 in all five seating positions of the vehicle, depending on the situation, there may exist a requirement to coordinate execution between ID component 111 executing on each mobile device. Backend component 115 can coordinate between each mobile device 101 grouped for the same vehicle. Or backend component 115 may allow each mobile device 101 to individually determine its own seating location. It is noted that the software located on all five mobile devices 101 can work independently and do not need to be aware of other mobile devices 101 grouped within the same vehicle.

In an embodiment, backend component 115 retrieves training data (step 502). Backend component 115 retrieves training data from database 116. Training data can contain frequencies, sound pressure of doors closing and DOA of all doors for all vehicles in existence. Training data can contain frequencies, DOA and SPL based on the operation of the ignition switch of the vehicle. Training data is used to for creating and retraining sound models.

In an embodiment, backend component 115 creates sound models (step 506). Next, backend component 115 trains sound model to recognize specific vehicles. Sound models are created through deep learning or other cognitive learning methodology to identify the vehicle based on the unique characteristics of the sounds of the doors closing and ignition switch operation. For example, the sound model created can include the following: classify closing door sound and ignition switch operation sound, classify seat location by using DOA and sound pressure of closing door and classifying seat location by using DOA and sound pressure of the operation of ignition switch. It is noted that other sounds can be used that are unique to the vehicle, such as, air conditioning blowing through vent, sunroof opening and closing and navigation startup screen sound.

In an embodiment, backend component 115 retrieves live data (step 504). Backend component 115 retrieves live data from mobile device 101 located in the vehicle. For example, a user enters the vehicle and closes the door. ID component 111 running on the mobile device 101 collects the sound and transmits the sound data to backend component 115.

In an embodiment, backend component 115 trains existing sound models (step 504). Backend component 115 retrieves live sound data from mobile device located in the vehicle, validates the sound data and updates the existing sound models. For example, a user can be asked to confirm the type of vehicle (e.g., year, make and model, etc.) by backend component 115 via dialogue box on the mobile device 101 before updating the sound model for that vehicle.

Figure 6:
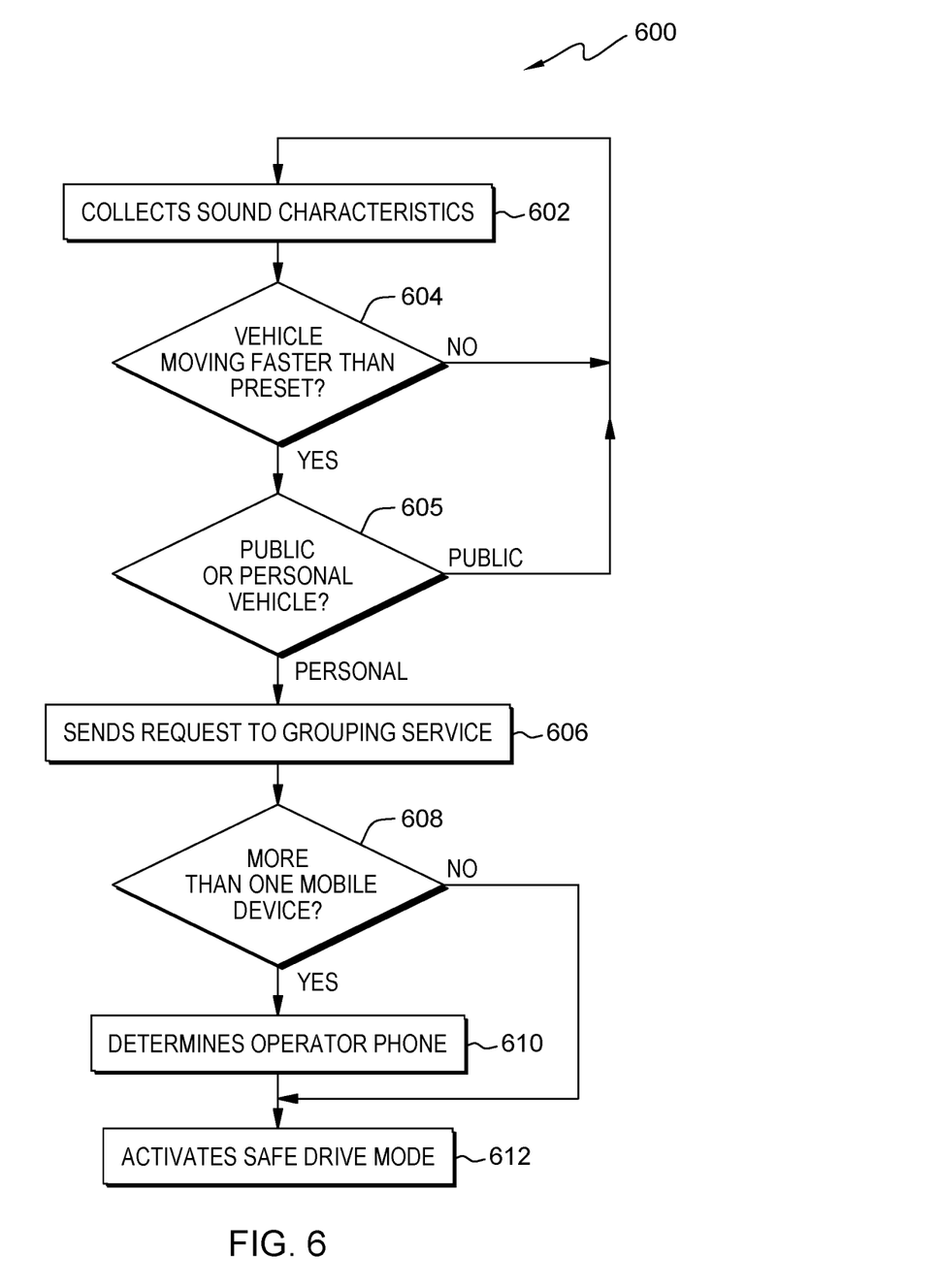
FIG. 6 is a flowchart illustrating activity of a mobile device, designated as 600, in accordance with an embodiment of the present invention.

FIG. 6 is a flowchart illustrating the activity of a mobile device 101, designated as 600 in accordance with an embodiment of the present invention.

In the present embodiment, ID component 111 collect sounds characteristics (step 602). ID component 111 via sound component 213 collect sounds made by the passenger after entering a vehicle.

In the present embodiment, ID component 111 determines whether the vehicle is moving faster than a preset threshold (decision block 604). ID component 111 via vehicle dynamics component 214 detects the velocity of the user via mobile device 101 based on known location detecting technology (e.g., GPS, cell phone triangulation, etc.). Furthermore, ID component 111 compares the current velocity of the user to a predetermined velocity. The predetermined velocity is dynamically adjustable by the user and can be a maximum walking velocity. For example, ID component 111 detects that the speed of the mobile device 101 is 20 miles per hour and the predetermined velocity is set to 15 miles per hour. The value of 15 miles per hour is used since most humans cannot walk that fast. Therefore, it is assumed that if a mobile device 101 is moving greater than the predetermined velocity (i.e., 15 mph) then the mobile device 101 is probably in a moving vehicle. It should be noted that ID component 111 can take several samples of the speed of the mobile device 101 over a predetermine period (e.g., 2 minutes, 5 minutes, etc.), user adjustable, before determining that the user is in vehicle. If the vehicle is moving faster than the pre-determined threshold then ID component 111 proceeds to decision block 605. If the vehicle is not moving faster than the pre-determined threshold then ID component 111 proceeds back to step 602.

It should be noted that movement tracking of all mobile devices 101 can be stored in database 116. It is further noted that the three sound models can be retrieved by ID component 111 during this step or any step before step 610.

In the present embodiment, ID component 111 determines whether the passenger is in a public or a private vehicle (decision block 605). ID component via vehicle dynamics component 214 can determine whether the user is in a public or private vehicle. If ID component 111 determines the mobile device 101 is traveling in a private vehicle then ID component 111 proceeds to step 606. If ID component 111 determines the passenger/driver are in a public vehicle, ID component 111 can return to an idle state (e.g., collecting sounds and position related data) by proceeding to step 602.

In the present embodiment, ID component 111 sends a request to a grouping service (step 606). ID component 111 sends a request to backend component 115 wherein backend component 115 can group multiple mobile devices 101 in the same vehicle into a group based on movement tracking and speed change history of the mobile devices 101.

In the present embodiment, ID component 111 determines whether there is more than one mobile device 101 (decision block 608). Using existing mobile phone location technology, ID component 111 can assess whether the first detected mobile device 101 is the only mobile device 101 in the vehicle. If ID component 111 determines that there is only one mobile device 101 ("NO" branch, decision block 608) then ID component 111 can conclude that the only mobile device 101 in the vehicle belongs to the driver/operator of the vehicle (i.e., is in the driver seating location) and can proceed to step 612. If ID component 111 determines that there is more than one mobile device 101 in the vehicle ("YES" branch, decision block 608) then ID component 111 proceeds to step 610.

In the present embodiment, ID component 111 determines the operator phone (step 610). ID component 111 through seat location component 215 can determine the location of the mobile device 101 by invoking three sound identification process models. For example, a first sound identification process model can determine the location of the mobile device 101 based on classifying the sound of the closing door and the operational sound of the ignition switch, a second sound identification process model can determine the location of the mobile device 101 based on analyzing DOA and SPL of the door closing sound and a third sound identification process model can determine the location of the mobile device 101 location based on analyzing DOA and SPL of the ignition switch operation sound. After the three sound identification process models have finished running, ID component 111 through seat location component 215 can "vote" on the location of the mobile device 101.

In the present embodiment, ID component 111 activates safe driving mode (step 612). ID component 111 through vehicle dynamic components 214 can activate safe driving mode after determining the mobile device in the driver seat location.

Figure 7:
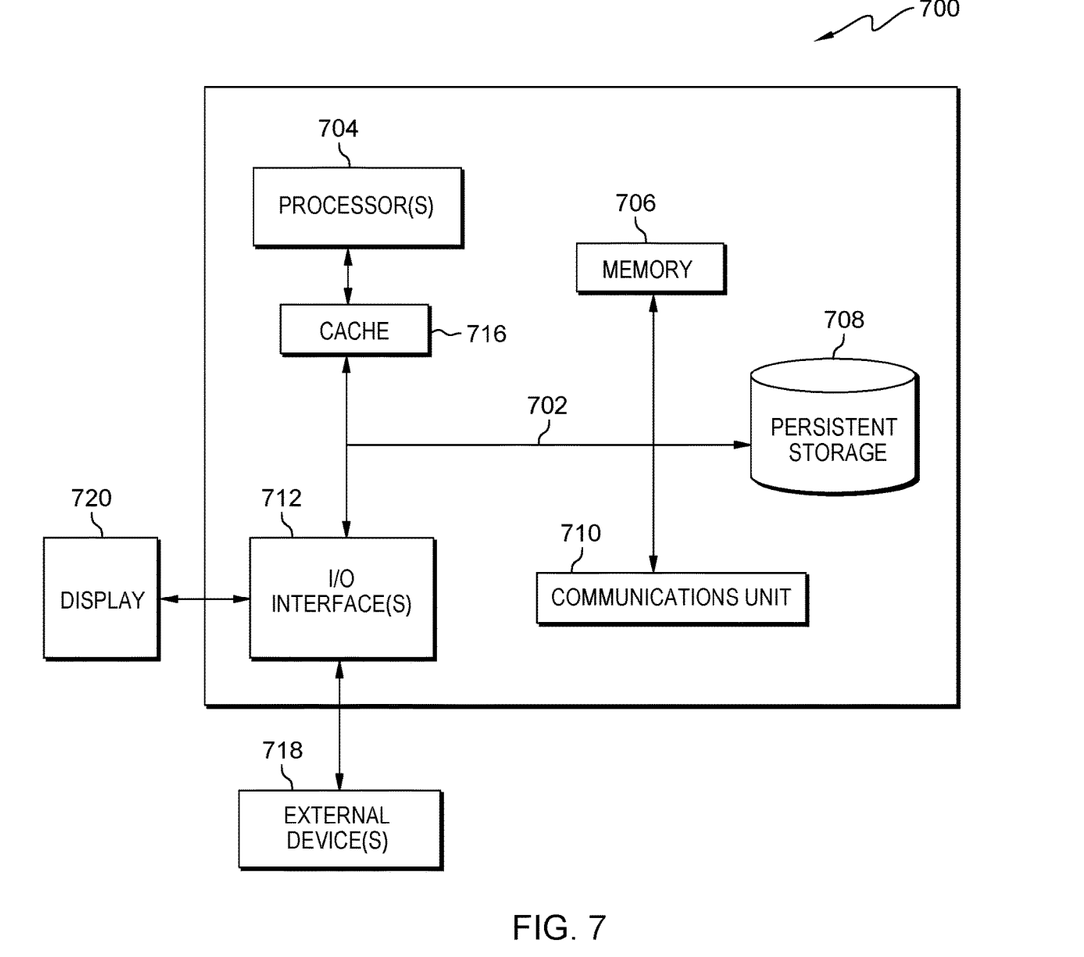
FIG. 7 depicts a block diagram, designated as 700, of components of a server computer executing a program within the mobile device detection environment of FIG. 1, in accordance with an embodiment of the present invention.

FIG. 7 depicts a block diagram, designated as 700, of components of the server computer executing the program within the mobile device detection environment, of FIG. 1, in accordance with an embodiment of the present invention.

Backend server 110 can include processor(s) 704, cache 716, memory 706, persistent storage 708, communications unit 710, input/output (I/O) interface(s) 712 and communications fabric 702. Communications fabric 702 provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of processor(s) 707 by holding recently accessed data, and data near recently accessed data, from memory 706.

Program instructions and data used to practice embodiments of the present invention, e.g., ID component 111 and database 116, can be stored in persistent storage 708 for execution and/or access by one or more of the respective processor(s) 707 of backend server 110 via memory 706. In this embodiment, persistent storage 708 includes a magnetic hard disk drive. Alternatively, or in addition to a magnetic hard disk drive, persistent storage 708 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices, including resources of backend server 110. In these examples, communications unit 710 includes one or more network interface cards. Communications unit 710 may provide communications through the use of either or both physical and wireless communications links. ID component 111 and database 116 may be downloaded to persistent storage 708 of backend server 110 through communications unit 710.

I/O interface(s) 712 allows for input and output of data with other devices that may be connected to backend server 110. For example, I/O interface(s) 712 may provide a connection to external device(s) 718 such as a keyboard, a keypad, a touch screen, a microphone, a digital camera, and/or some other suitable input device. External device(s) 718 can also include portable computer readable storage media such as, for example, thumb drives, portable optical or magnetic disks, and memory cards. Software and data used to practice embodiments of the present invention, e.g., ID component 111 and database 116 on backend server 110, can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor or the lenses of a head mounted display. Display 720 can also function as a touchscreen, such as a display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for determining a location of a mobile device in a vehicle, the method comprising:
   collecting, by one or more computer processors, sound characteristics associated with a vehicle by a mobile device;
   determining, by the one or more computer processors, if the mobile device is moving faster than a predetermined velocity;
   responsive to determining that the mobile device is moving faster than the predetermined velocity, sending, by the one or more computer processors, a request to a grouping service on a server to provide grouping information comprising a grouping value of how many mobile devices are in the vehicle and a status indicating if the vehicle is public transportation;
   responsive to receiving a response from the grouping service that the vehicle is not public transportation and the grouping value is equal to one, activating, by the one or more processors, a safe driving mode feature of the mobile device;
   creating, by the one or more computer processors, one or more sound models on a server, wherein the one or more sound models further comprises of, but it is not limited to, a first model using acoustic feature one or more doors closing, using DOA (direction of arrival) and sound pressure of the one or more doors closing and using DOA and sound pressure associated with an operation of ignition switch;
   retrieving, by the one or more computer processors, the one or more sound models from the server; and
   determining, by the one or more processors, if the mobile device is located in the region of the vehicle associated with the driver's seat based on one or more sound identification processes and the one or more sound models, wherein the one or more sound identification process comprises:
   classifying a first sound of the one or more doors closing, a second sound based on an operational sound of the ignition switch; and
   predicting the region of the vehicle associated with the driver's seat by using one or more DOA sounds based on the first sound and the second sound and using a first sound pressure level associated with the operation of ignition switch and a second sound pressure level associated with one or more doors closing and based on the one or more sound models;
   responsive to receiving a response from the grouping service that the vehicle is not public transportation, the grouping value is greater than one and the mobile device is in the region of the vehicle associated with the driver's seat, activating, by the one or more processors, a safe driving mode feature of the mobile device.

2. The computer-implemented method of claim 1, wherein collecting sound characteristics associated with a vehicle by a mobile device belonging to the user, further comprises of recording door sound associated closing with one or more doors of the vehicle and an ignition sound based on operating an ignition.

3. The computer-implemented method of claim 1, wherein determining which one of the mobile devices is located in the region of the vehicle associated with the driver's seat, further comprising:
  activating, by the one or more computer processors, one or more sound identification processes; and
  voting, by the one or more computer processors, on a final location of the mobile device belonging to the user based on the one or more sound identification processes.

4. The computer-implemented method of claim 1, wherein activating a safe drive mode feature on the mobile device belonging to the user of the vehicle, further comprises of disabling data access on the mobile device.

5. The computer-implemented method of claim 1, wherein determining if the mobile device belonging to the user is moving faster than the predetermined velocity, further comprises of comparing a current velocity of the mobile device against the predetermined velocity.

6. The computer-implemented method of claim 1, wherein requesting to a grouping service on the server further comprises of sending a REST API command to the server.

7. The computer-implemented method of claim 1, wherein determining the number of the mobile device in the vehicle, further comprising:
  sending, by the one or more computer processors, a location coordinate to the server; and
  receiving an acknowledgment from the server that there is more than one mobile device in the vehicle.

8. A computer system for determining a location of a mobile device in a vehicle, the computer system comprising:
  one or more computer processors;
  one or more non-transitory computer readable storage media;
  program instructions stored on the one or more non-transitory computer readable storage media for execution by at least one of the one or more computer processors, the program instructions comprising:
  program instructions to collect sound characteristics associated with a vehicle by a mobile device;
  program instructions to determine if the mobile device is moving faster than a predetermined velocity;
  responsive to determining that the mobile device is moving faster than the predetermined velocity, program instructions to send a request to a grouping service on a server to provide grouping information comprising a grouping value of how many mobile devices are in the vehicle and a status indicating if the vehicle is public transportation;
  responsive to receiving a response from the grouping service that the vehicle is not public transportation and the grouping value is equal to one, program instructions to activate a safe driving mode feature of the mobile device;
  program instructions to create one or more sound models on a server, wherein the one or more sound models, further comprises of, but it is not limited to, a first model using acoustic feature one or more doors closing, using DOA (direction of arrival) and sound pressure of the one or more doors closing and using DOA and sound pressure associated with an operation of an ignition switch;
  program instructions to retrieve the one or more sound models from the server; and
  program instructions to determine if the mobile device is located in the region of the vehicle associated with the driver's seat based on one or more sound identification processes and the one or more sound models, wherein the one or more sound identification process comprises:
  program instructions to classify a first sound of the one or more doors closing, a second sound based on an operational sound of the ignition switch; and
  program instructions to predict the region of the vehicle associated with the driver's seat by using one or more DOA sounds based on the first sound and the second sound and using a first sound pressure level associated with the operation of ignition switch and a second sound pressure level associated with one or more doors closing and based on the one or more sound models;
  responsive to receiving a response from the grouping service that the vehicle is not public transportation, the grouping value is greater than one and the mobile device is in the region of the vehicle associated with the driver's seat, program instructions to activate a safe driving mode feature of the mobile device.

9. The computer system of claim 8, wherein program instructions to collecting sound characteristics associated with a vehicle by a mobile device belonging to the user, further comprises of recording door sound associated with closing one or more doors of the vehicle and an ignition sound based on operating an ignition.

10. The computer system of claim 8, wherein program instructions to determine if the mobile device is located in the region of the vehicle associated with the driver's seat, further comprising:
  program instructions to activate one or more sound identification processes; and
  program instructions to vote on a final location of the mobile device belonging to the user based on the one or more sound identification processes.

11. The computer system of claim 8, wherein program instructions to activate a safe drive mode feature on the mobile device belonging to the user of the vehicle, further comprises of disabling data access on the mobile device.

12. The computer system of claim 8, wherein program instructions to determine if the mobile device belonging to the user is moving faster than the predetermined velocity, further comprises of comparing a current velocity of the mobile device against the predetermined velocity.

13. The computer system of claim 8, wherein program instructions to request grouping service on the server further comprises of sending a REST API command to the server.

14. The computer system of claim 8, wherein program instructions to determine the number of the mobile device in the vehicle, further comprising:
  program instructions to send a location coordinate to the server; and
  program instructions to receive an acknowledgment form the server that there is more than one mobile device in the vehicle.

* * * * *